United States Patent
Terada et al.

(10) Patent No.: US 10,107,189 B2
(45) Date of Patent: Oct. 23, 2018

(54) PACKAGE-STORAGE TYPE ENGINE GENERATOR

(71) Applicant: YANMAR CO., LTD., Osaka-shi (JP)

(72) Inventors: Ruriko Terada, Osaka (JP); Tatsuya Kawano, Osaka (JP)

(73) Assignee: YANMAR CO., LTD., Osaka-shi (JP)

( * ) Notice: Subject to any disclaimer, the term of this patent is extended or adjusted under 35 U.S.C. 154(b) by 0 days.

(21) Appl. No.: 15/123,010

(22) PCT Filed: Feb. 13, 2015

(86) PCT No.: PCT/JP2015/053897
§ 371 (c)(1),
(2) Date: Sep. 1, 2016

(87) PCT Pub. No.: WO2015/146343
PCT Pub. Date: Oct. 1, 2015

(65) Prior Publication Data
US 2017/0074161 A1  Mar. 16, 2017

(30) Foreign Application Priority Data

Mar. 26, 2014 (JP) .................................. 2014-063048

(51) Int. Cl.
*F02B 63/00* (2006.01)
*F02B 63/04* (2006.01)
(Continued)

(52) U.S. Cl.
CPC .............. *F02B 63/044* (2013.01); *F01P 3/20* (2013.01); *F01P 5/02* (2013.01); *F02B 63/04* (2013.01); *F02B 77/11* (2013.01); *H02K 7/1815* (2013.01)

(58) Field of Classification Search
CPC ........ F02B 63/044; F02B 63/04; F02B 77/11; F02B 77/13; F01P 5/02; F01P 3/20; H02K 7/1815; H02K 5/10; H02K 5/22
(Continued)

(56) References Cited

U.S. PATENT DOCUMENTS

| | | | |
|---|---|---|---|
| 4,241,702 A * | 12/1980 | Takeuchi | ............... B60K 11/08 123/195 C |
| 4,548,164 A | 10/1985 | Ylonen et al. | |

(Continued)

FOREIGN PATENT DOCUMENTS

| | | |
|---|---|---|
| DE | 3502000 A1 | 8/1985 |
| EP | 2141334 A2 | 1/2010 |

(Continued)

OTHER PUBLICATIONS

Supplementary European Search Report dated Feb. 28, 2017, issued for the European patent application No. 15767719.6.

(Continued)

*Primary Examiner* — Hung Q Nguyen
(74) *Attorney, Agent, or Firm* — Locke Lord LLP

(57) ABSTRACT

In a package-storage type engine generator, a package (2) is partitioned into an upper section and a lower section. An engine (11) and a generator (12) are disposed in the lower section, and a radiator (42) and a radiator fan (43) are disposed in the upper section. An upper/lower partition member (32) partitions the package (2) into the upper section and the lower section. A portion of the upper/lower partition member (32), which faces the radiator fan (43), is formed in a downward inclined shape from a center portion to an outer edge portion of the package.

1 Claim, 11 Drawing Sheets

(51) Int. Cl.
  *F02B 77/11* (2006.01)
  *F01P 3/20* (2006.01)
  *F01P 5/02* (2006.01)
  *H02K 7/18* (2006.01)
(58) Field of Classification Search
  USPC .................................. 123/2, 3; 181/202, 204
  See application file for complete search history.

(56) References Cited

U.S. PATENT DOCUMENTS

| | | | |
|---|---|---|---|
| 7,107,943 B2 * | 9/2006 | Yasuda | ..................... F01P 11/12 123/41.49 |
| 2011/0310532 A1 * | 12/2011 | Niwa | ...................... F02B 63/04 361/601 |

FOREIGN PATENT DOCUMENTS

| | | |
|---|---|---|
| JP | 2001-116296 A | 4/2001 |
| JP | 2010-014014 A | 1/2010 |
| JP | 5184900 B2 | 1/2013 |
| JP | 5296582 B2 | 9/2013 |
| WO | 02/065620 A1 | 8/2002 |

OTHER PUBLICATIONS

International Search Report dated May 19, 2015, issued for PCT/JP2015/053897.
Office Action, dated Jan. 24, 2018, issued by the Chinese Patent Office, in corresponding Chinese Patent Application No. 201580014749.4.

* cited by examiner (a)

(b)

(a)

(b)

(a)

(b)

(a)

(b)

(a)

(b)

PACKAGE-STORAGE TYPE ENGINE GENERATOR

TECHNICAL FIELD

The present invention relates to a package-storage type engine generator, and in particular relates to improvement of a structure for preventing water accumulation in a package-storage type engine generator.

BACKGROUND ART

Conventionally, a package-storage type engine generator is known, in which engine intake and exhaust system components are provided in an upper portion of a package (see, for example, Patent Document 1). The engine generator described in Patent Document 1 includes a device chamber in which are disposed an engine and a refrigerant device such as a compressor, a heat exchange chamber in which are disposed an outdoor heat exchanger and a fan, and a drain pan also used as an upper/lower partition wall partitioning the lower device chamber and the upper heat exchange chamber. A through hole, which communicates the device chamber with the heat exchange chamber, is formed in the drain pan that is also used as the upper/lower partition wall. A circumference of the through hole is covered with an external duct.

PRIOR ART DOCUMENT

Patent Document

[Patent Document 1] Japanese Patent No. 5184900

SUMMARY OF INVENTION

Problem to Be Solved by Invention

However, Patent Document 1 does not disclose any structure for preventing water accumulation in an upper/lower partition member itself. That is, since rainwater enters the heat exchange chamber, it is necessary to drain the rainwater that enters the package so as to prevent the rainwater that entered via the heat exchange chamber from further entering the machine chamber in which machinery such as the engine is disposed. Also, as the drain pan also used as the upper/lower partition wall is made of a plate-like member, the central portion thereof is likely to be bent downward, which results in the rainwater accumulation in such a downward-bent central portion.

An object of the present invention is to provide a structure for preventing water from accumulating in an upper/lower partition member itself of a package-storage type engine generator that is partitioned into an upper section and a lower section.

Means for Solving Problem

The present invention was made in consideration of the above circumstances. A package-storage type engine generator of the present invention includes: a package partitioned into an upper section and a lower section; an engine and a generator both disposed in the lower section; a radiator and a radiator fan both disposed in the upper section; and an upper/lower partition member configured to partition the package into the upper section and the lower section. A portion of the upper/lower partition member, which faces the radiator fan, is formed in a downward inclined shape from a center portion to an outer edge portion of the package.

In the present invention, the portion of the upper/lower partition member, which faces the radiator fan, is formed as the downward inclined shape from the center portion to the outer edge portion of the package. Thus, the center portion of the upper/lower partition member is not bent downward. Rainwater that passes through the radiator fan and the radiator flows over the surface that inclines downward from the center portion to the outer edge portion of the package, which can prevent the rainwater from accumulating in the center portion of the upper/lower partition member.

Effects of Invention

In the present invention, the upper/lower partition member, which partitions the package into the upper section and the lower section, has a portion that faces the radiator fan. The above portion has a downward inclined shape from the center portion to the outer edge portion of the package. Thus, it is possible to prevent the water accumulation in the central portion caused by bending.

BRIEF DESCRIPTION OF DRAWINGS

FIG. 1(a) is an internal structure view thereof, while FIG. 1(b) is an external view thereof.

FIG. 2(a) is an internal structure view thereof, while FIG. 2(b) is an external view thereof.

FIG. 3(a) is an internal structure view thereof, while FIG. 3(b) is an external view thereof.

FIG. 4(a) is an internal structure view thereof, while FIG. 4(b) is an external view thereof.

FIG. 5(a) is an internal structure view thereof, and FIG. 5(b) is an external view thereof.

MODES FOR CARRYING OUT INVENTION

Figure 1:
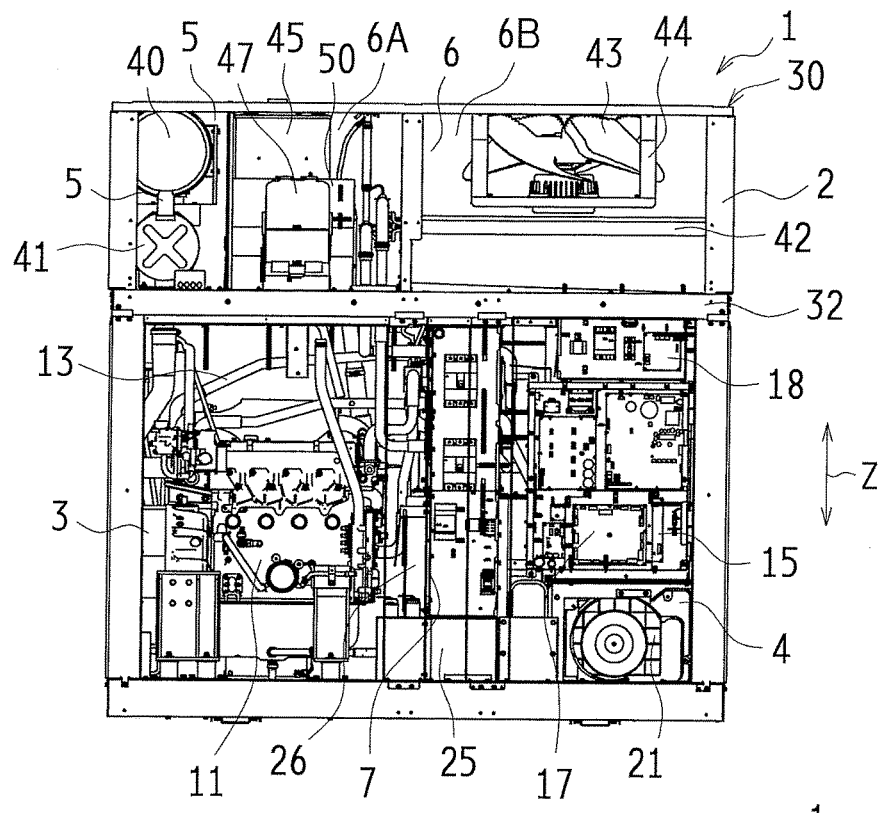
FIG. 1 are front views of a cogeneration system according to an embodiment.
Figure 1:
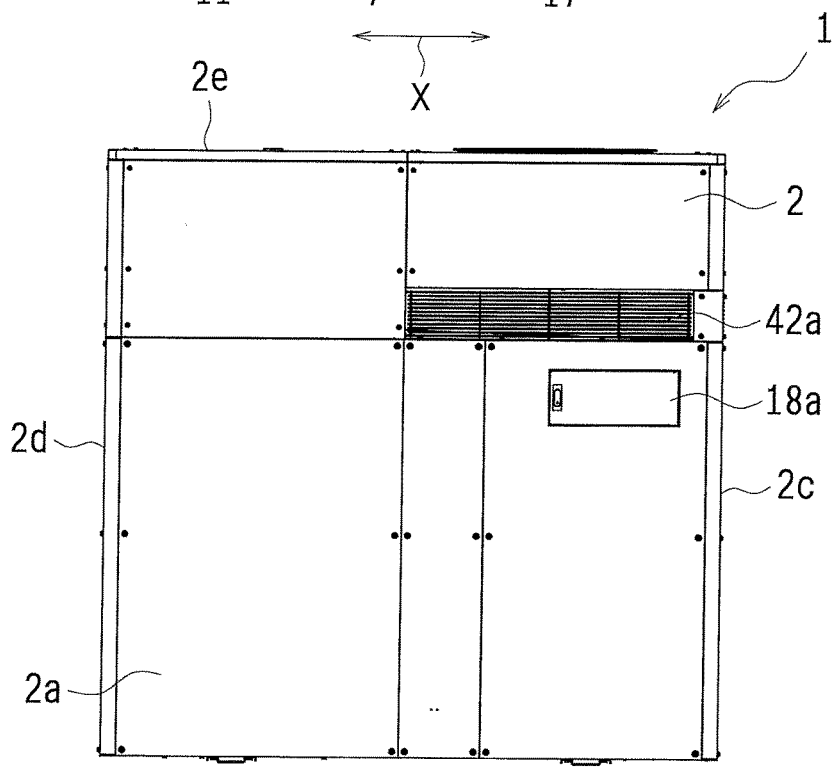
Figure 2:
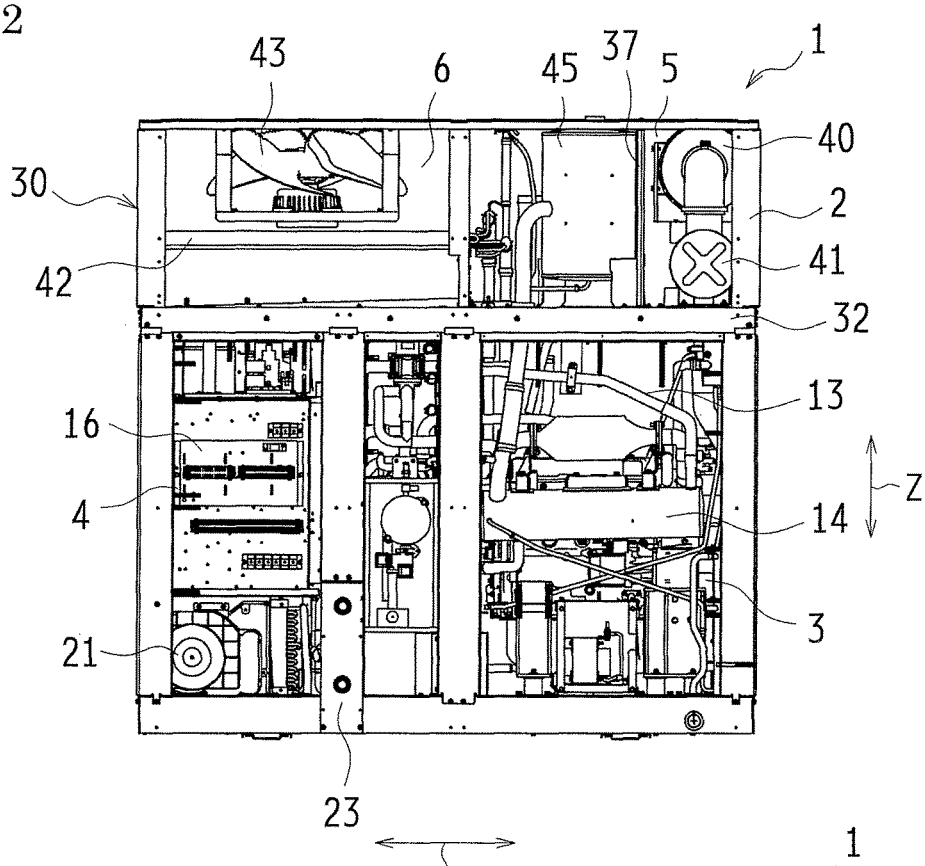
FIG. 2 are back views of the cogeneration system according to the embodiment.
Figure 2:
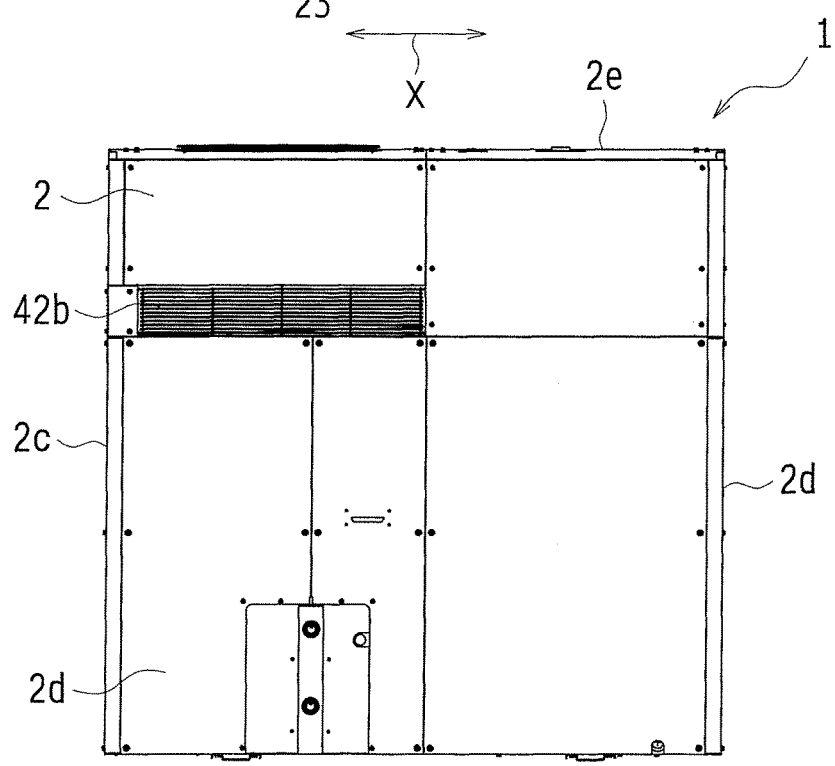
Figure 3:
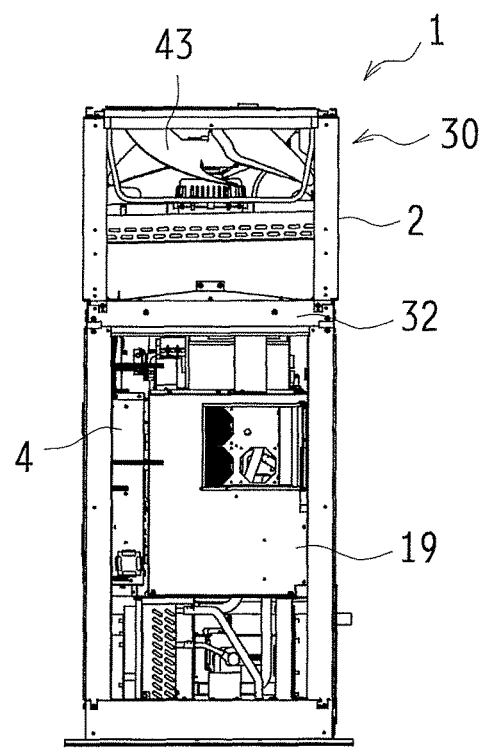
FIG. 3 are right side views of the cogeneration system according to the embodiment.
Figure 3:
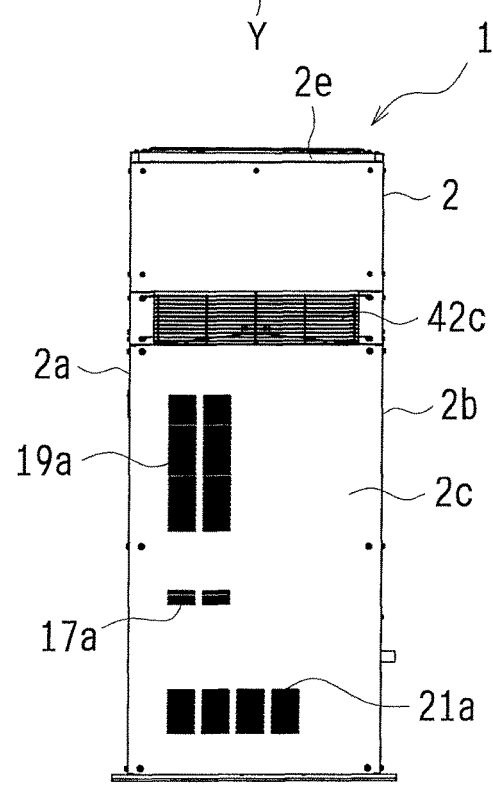
Figure 4:
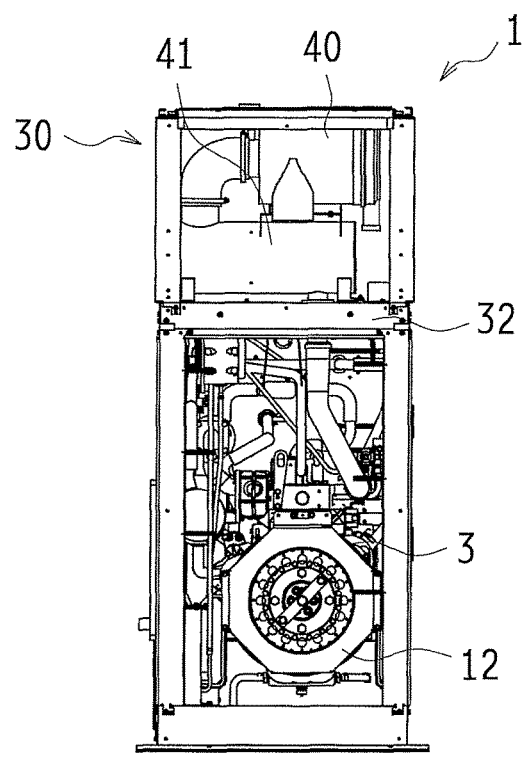
FIG. 4 are left side views of the cogeneration system according to the embodiment.
Figure 4:
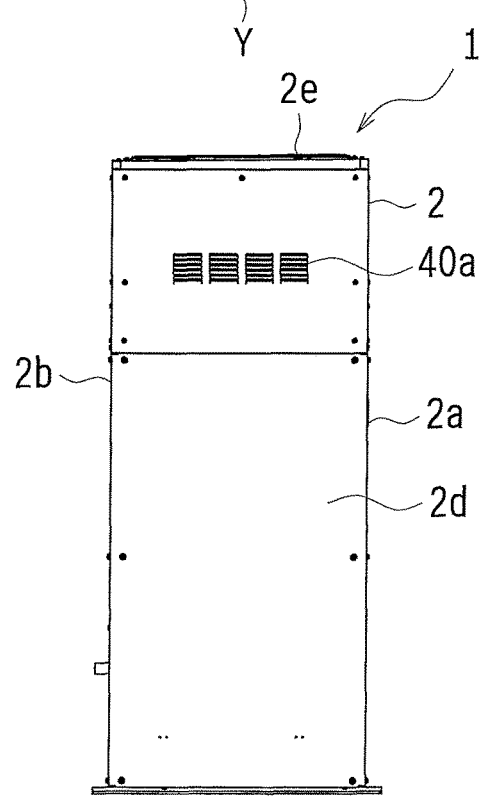
Figure 5:
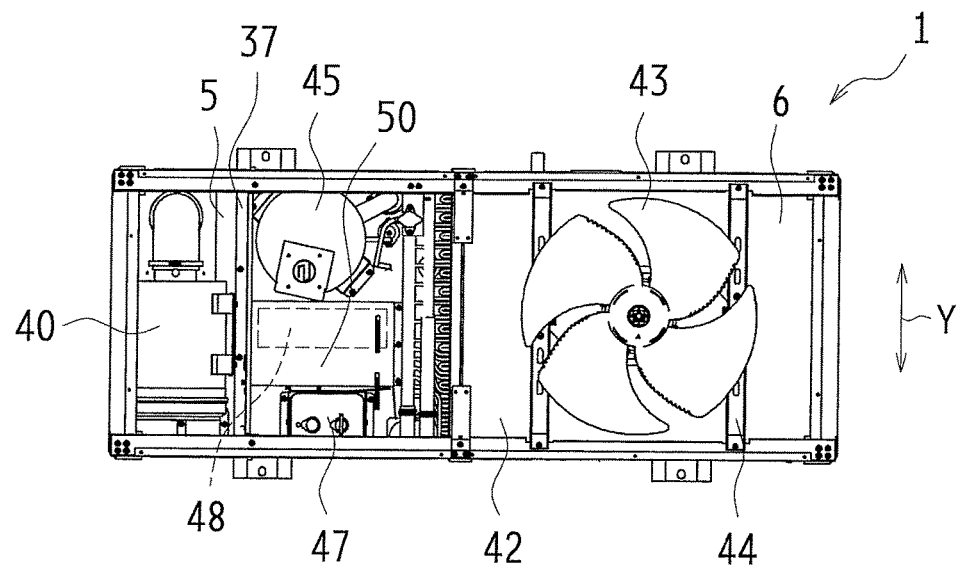
FIG. 5 are plan views of the cogeneration system according to the embodiment.
Figure 5:
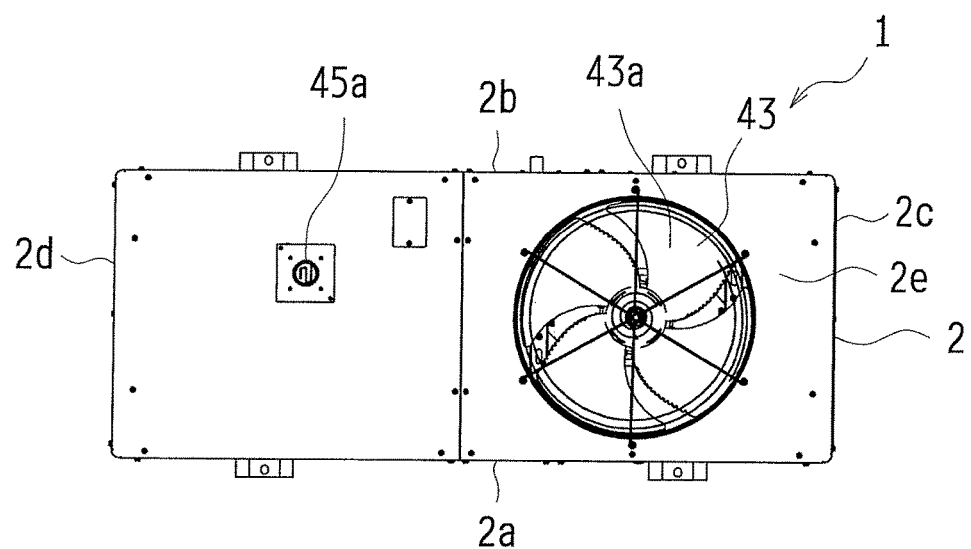

Hereinafter, an embodiment of the present invention will be described with reference to the appended drawings. FIGS. 1 to 5 are respectively front views, back views, right side views, left side views and plan views of a cogeneration system 1 according to this embodiment. FIGS. 1(a) to 5(a) are internal structure views thereof, while FIGS. 1(b) to 5(b) are external views thereof.

In this embodiment, description will be given on a case in which the present invention is applied to the cogeneration system 1. The cogeneration system 1 is a system configured to: electrically connect a commercial power system of an external commercial power supply and a generation power system of a generator 12 to a power transmission system for power consuming devices (load) so as to cover a demand power of the load; and recover waste heat accompanying power generation so as to use the recovered waste heat. That is, the cogeneration system 1 has, in addition to a power generation function outputting a power generated by the generator 12 driven by an engine 11, a function that recovers, by an engine waste heat recovery unit 23, waste heat of cooling water that is circulated by the engine coolant circuit 13 and that is heated by heat exchange with waste heat of the engine 11 (i.e., in this embodiment, the function that recovers the waste heat of the cooling water for use in supplying hot-water).

As shown in FIGS. 1 to 5, the cogeneration system 1 according to this embodiment includes a package 2 as a housing formed in a substantially rectangular parallelepiped shape. The package 2 can be divided into an upper section and a lower section by an upper/lower partition member 32 that is disposed above the middle of the package 2 in the vertical direction Z and that partitions the package 2 into the upper section and the lower section. On the lower side (in the lower section) of the package 2, an engine chamber 3 and a device housing chamber 4 are disposed, while on the upper side (in the upper section), an intake chamber 5 and a radiator/exhaust chamber 6 are disposed. A partition wall 7 partitions the lower section into the left section and the right section as the engine chamber 3 and the device housing chamber 4.

(Engine Chamber)

The engine chamber 3 is disposed on one side of the package 2 in the long-side direction X (in this embodiment, on the left side in FIG. 1(a) and on the right side in FIG. 1(b)). In the engine chamber 3, the generator 12 is disposed on one side in the long-side direction X relative to the engine 11 as the center. The generator 12 is driven by rotary drive of the engine 11.

As the engine 11, for example, a gas engine is adopted. The engine 11 is started by mixing fuel gas with air. Then, the generator 12, which is disposed consecutively with the engine 11, is driven by the rotary drive of the engine 11. As shown in FIGS. 1(a), 2(a) and 4(a), in the upper periphery of the engine 11, the following are disposed: the engine coolant circuit 13 that cools the engine by circulating the cooling water; and an exhaust gas heat exchanger 14 that exchanges heat between exhaust gas discharged from the engine 11 and the cooling water from the engine 11.

(Device Housing Chamber)

The device housing chamber 4 is disposed on the other side of the package 2 in the long-side direction X (on the right side in FIG. 1(a)). In the device housing chamber 4, a controller box 17 and an operation unit 18 are disposed on one side of the package 2 in the short-side direction (front-back direction) Y (in this embodiment, the front side) (see FIG. 1(a)). The controller box 17 includes a controller 15 that controls engine drive devices and engine waste heat recovery devices. The operation unit 18 operates electrical devices. Also, in a right side surface 2c of the package 2, a controller box ventilation hole 17a is formed at a position corresponding to the controller box 17 so as to introduce the outside air to the controller box 17 (see FIG. 3(b)). In a front surface 2a of the package 2, the operation unit door 18a is disposed at a position corresponding to the operation unit 18 so as to operate the operation unit 18 (see FIG. 1(b)).

An inverter 19 is disposed on the other side of the package 2 in the long-side direction X (see FIG. 3(a)). Also, in the right side surface 2c of the package 2, an inverter ventilation hole 19a is formed at a position corresponding to the inverter 19 so as to introduce the outside air to the inverter 19 (see FIG. 3(b)).

A terminal unit 16 (terminal block) is disposed on the other side of the package 2 in the short-side direction Y so as to wire the electrical devices. A ventilation fan 21 is disposed in a lower portion on the other side of the package 2 in the long-side direction X so as to suck the outside air into the engine chamber 3 (see FIG. 2(a)). Also, in the right side surface 2c of the package 2, an engine chamber ventilation hole 21a is formed so as to introduce the outside air into the engine chamber 3 (see FIG. 3(b)).

A sub-oil tank 25 and a reserve oil tank 26 are disposed in the middle of the package 2 in the long-side direction X and on the one side of the package 2 in the short-side direction Y (see FIG. 1(a)). Also, the engine waste heat recovery unit 23 is disposed in the middle of the package 2 in the long-side direction X and on the other side of the package 2 in the short-side direction Y so as to recover waste heat of the cooling water that flows from the exhaust gas heat exchanger 14 (see FIG. 2(a)).

Figure 6:
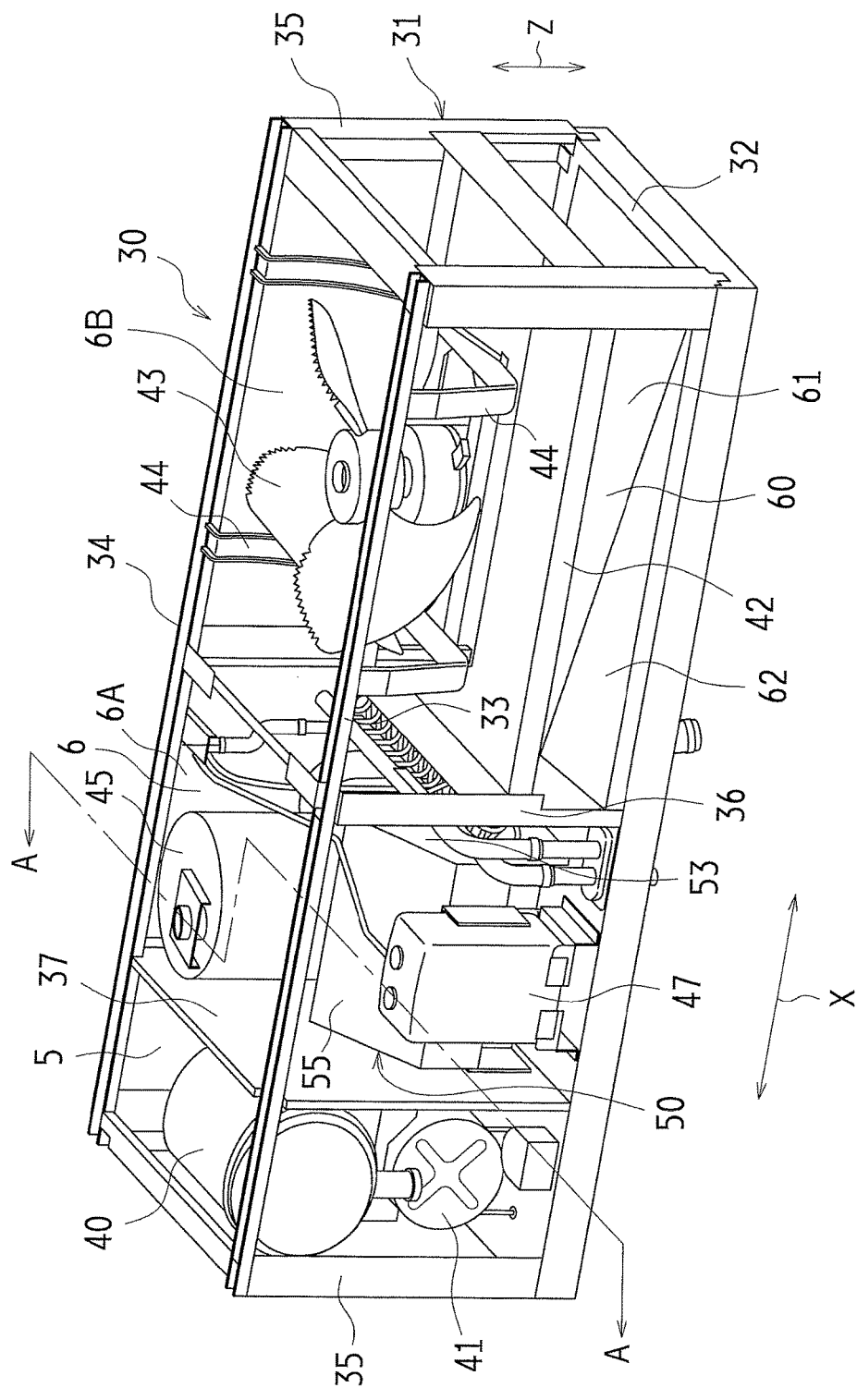
FIG. 6 is a perspective view of an upper structure.
Figure 7:
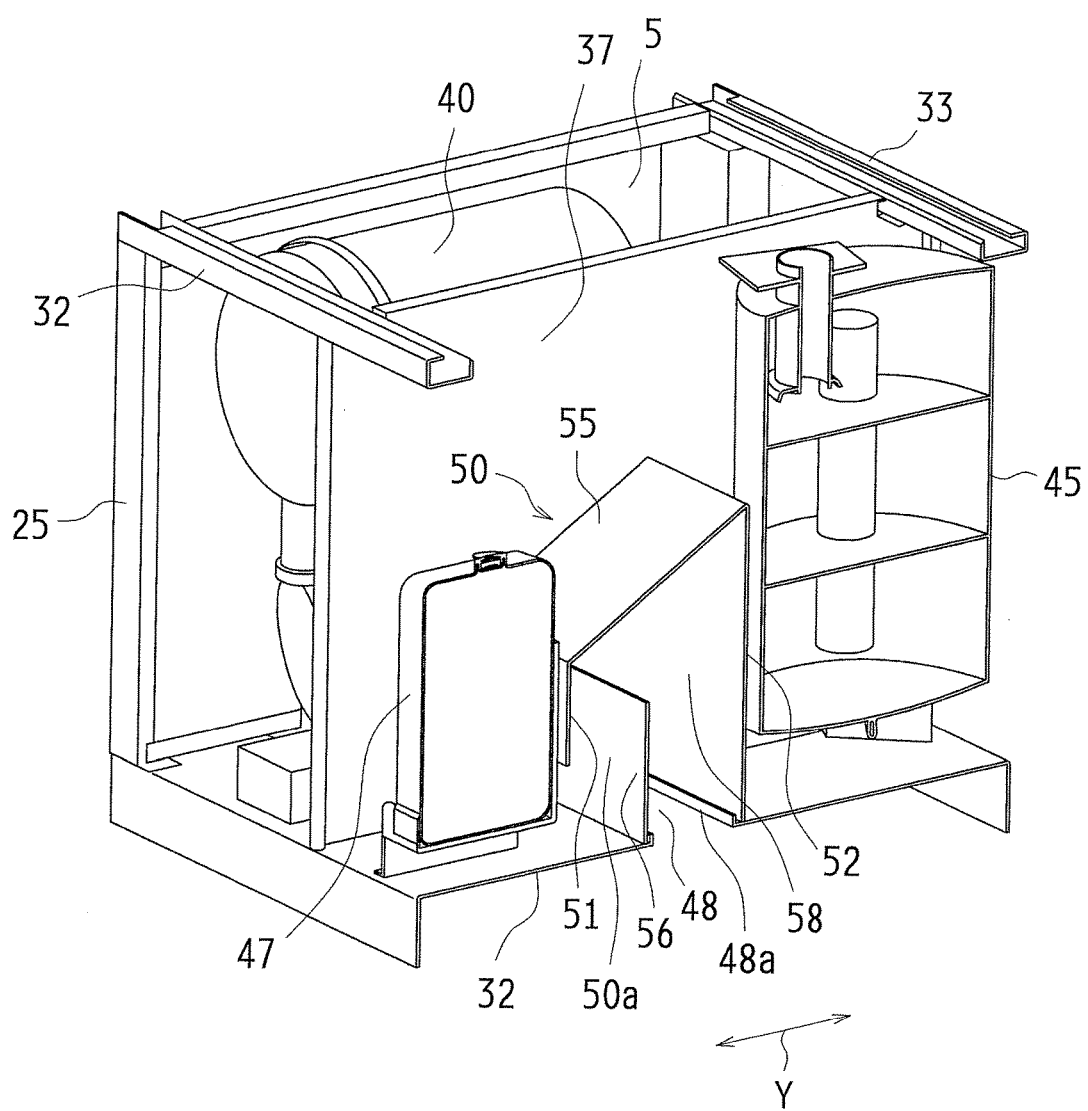
FIG. 7 is a cross-sectional view viewed along arrows A-A in FIG. 6.
Figure 8:
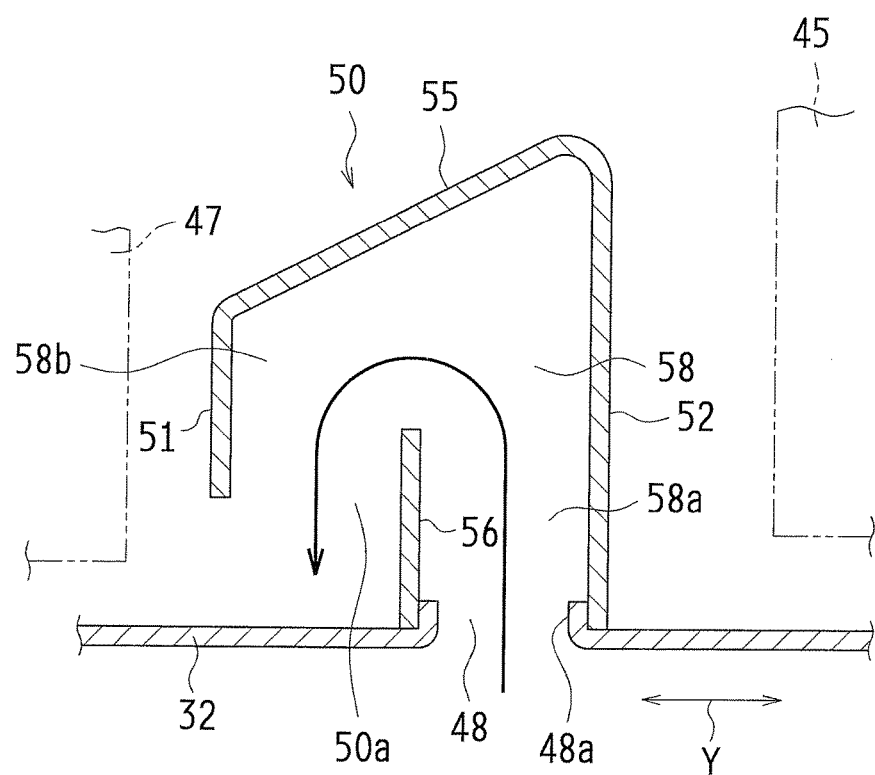
FIG. 8 is an enlarged cross-sectional view showing a main part of the upper structure.
Figure 9:
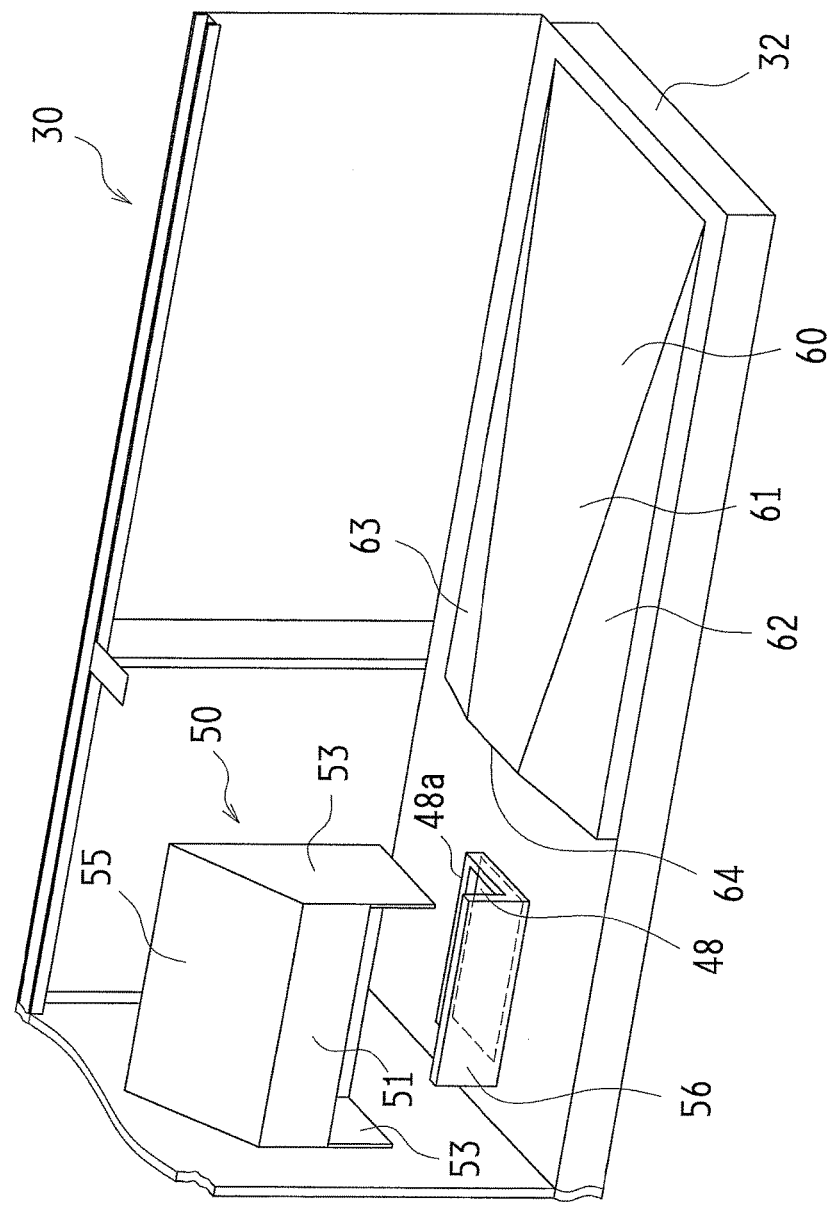
FIG. 9 is an exploded perspective view of an upper/lower partition member and a ventilation hood of the upper structure.
Figure 10:
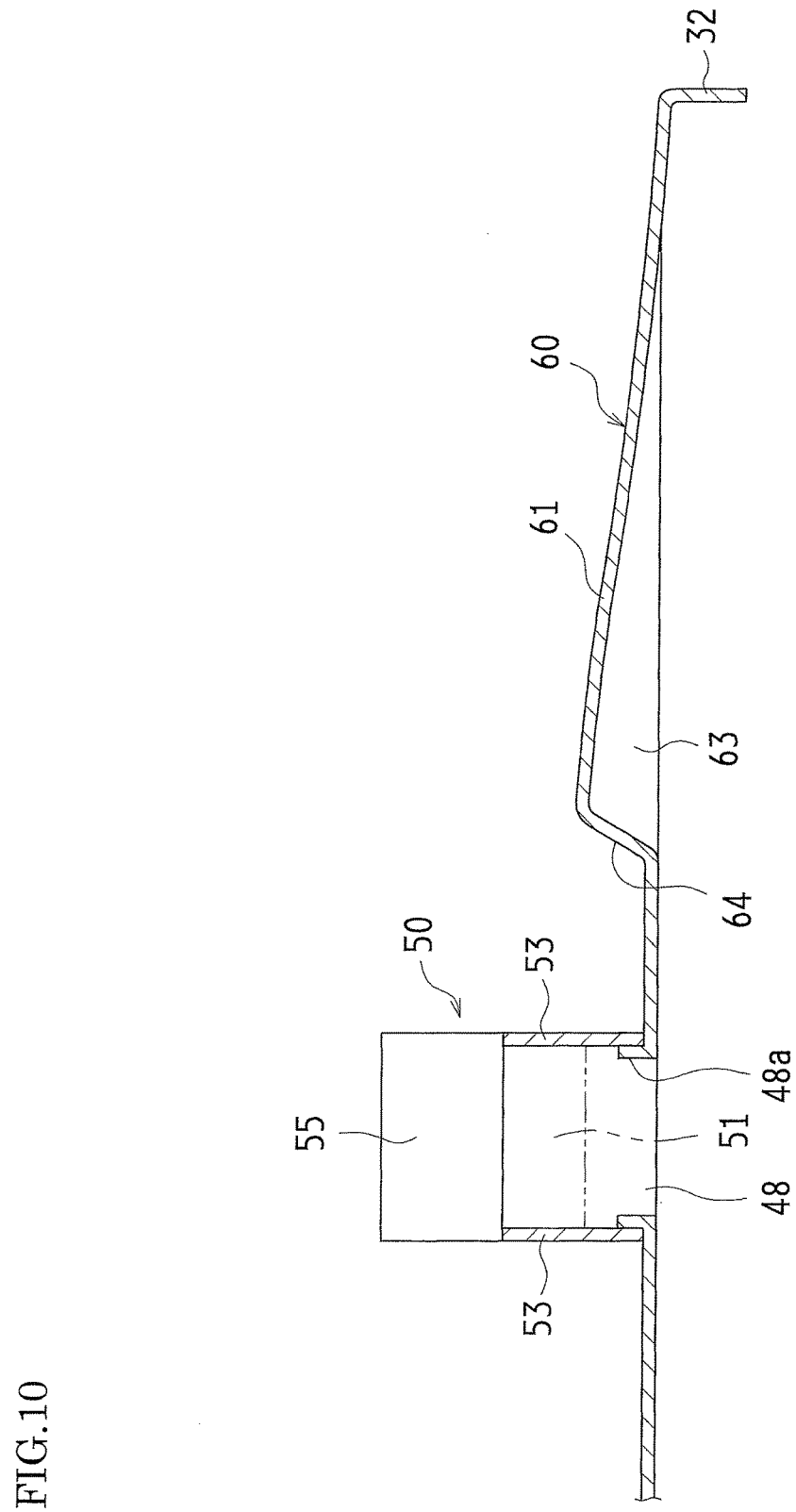
FIG. 10 is a cross-sectional view of the upper/lower partition member and the ventilation hood.
Figure 11:
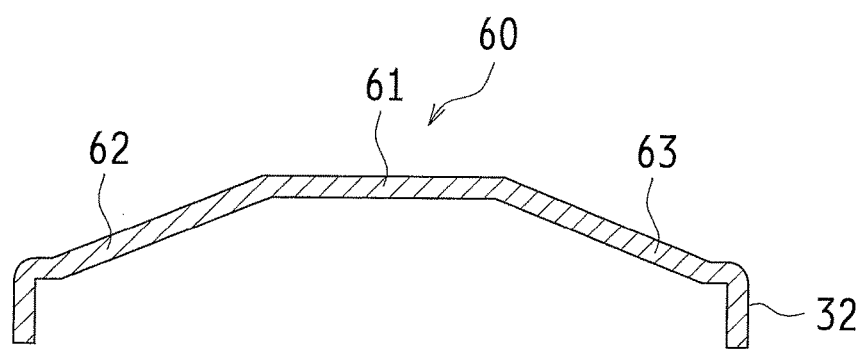
FIG. 11 is a cross-sectional view of the upper/lower partition member.

Here, description will be given on an upper structure 30 having the intake chamber 5 and the radiator/exhaust chamber 6. FIG. 6 is a perspective view of the upper structure 30. FIG. 7 is a cross-sectional view viewed along arrows A-A in FIG. 6. FIG. 8 is an enlarged cross-sectional view showing a main part of the upper structure 30. FIG. 9 is an exploded perspective view of the upper/lower partition member and a ventilation hood of the upper structure. FIG. 10 is a cross-sectional view of the upper/lower partition member and the ventilation hood. FIG. 11 is a cross-sectional view of the upper/lower partition member.

The upper structure 30 includes a frame body 31 in a rectangular parallelepiped shape and a package forming plate to which the frame body 31 is attached. The frame body 31 includes: the upper/lower partition member 32 made of sheet metal constituting a floorboard; portal support members 35 and 35 disposed in a standing manner on both sides of the upper/lower partition member 32 in the long-side direction X; a front horizontal member 33 and a rear horizontal member 34 bridged between the left and right support members 35 and 35; and an intermediate support 36 disposed in the middle of the front horizontal member 33 and the rear horizontal member 34. The intake chamber 5 and the radiator/exhaust chamber 6 are formed and partitioned by, for example, a partition wall 37 made of metal plate.

(Intake Chamber)

The intake chamber 5 is disposed on one side of the upper structure 30 in the long-side direction X. An air cleaner 40, which purifies air sucked from the outside, is disposed in an upper portion of the intake chamber 5, and an intake silencer 41, which reduces noise of the engine 11, is disposed in a lower portion thereof. In a left side surface 2d of the package 2, an engine intake port 40a is formed at a position corresponding to the air cleaner 40 so as to introduce the outside air to the air cleaner 40 (see FIG. 4(b)).

(Radiator/Exhaust Chamber)

The radiator/exhaust chamber 6 is disposed on the other side of the upper structure 30 in the long-side direction X relative to the intake chamber 5. Specifically, the radiator/exhaust chamber 6 is made by integrating a space for an exhaust chamber 6A located above the engine chamber 3 and a space for a radiator chamber 6B located above the device housing chamber 4. There is no partition wall that divides the exhaust chamber 6A from the radiator chamber 6B. The intake chamber 5, the exhaust chamber 6A and the radiator chamber 6B are arranged in a line from one side to the other side of the upper structure 30 in the long-side direction X.

In the radiator/exhaust chamber 6, a radiator 42 is horizontally disposed in the middle portion in the vertical direction Z so as to radiate the waste heat of the cooling water that is discharged from the exhaust gas heat exchanger 14. The four corners of the radiator 42 are supported in a hanging manner by the support member 35 and the intermediate support 36. In the front surface 2a, a back surface 2b and the right side surface 2c of the package 2, radiator ventilation holes 42a, 42b and 42c are respectively formed at respective positions corresponding to the radiator 42 so as to introduce the outside air to the radiator 42 (see FIGS. 1(b), 2(b) and 3(b)).

Above the radiator 42, a radiator fan 43 is disposed. The radiator fan 43 is driven and controlled by the controller 15 to discharge the air in the radiator/exhaust chamber 6 to the outside, thereby radiating the heat of the radiator 42. The radiator fan 43 is secured to U-shaped frame members 44 that are attached to the front horizontal member 33 and the rear horizontal member 34. In a top surface 2e of the package 2, a ventilation outlet 43a is formed at a position corresponding to the radiator fan 43 (see FIG. 5(b)).

Also, a reserve coolant tank 47 is disposed on the one side of the package 2 in the short-side direction Y so as to supply the cooling water to the engine coolant circuit 13. An exhaust silencer 45 is disposed on the other side of the package 2 in the short-side direction Y so as to reduce exhaust noise when exhaust gas is discharged to the outside (see FIGS. 1(a), 2(a), 5(a) and 6). In the top surface 2e of the package 2, an exhaust outlet opening 45a is formed at a position corresponding to the exhaust silencer 45 (see FIG. 5(b)).

On the upper/lower partition member 32, there is a space between the reserve coolant tank 47 and the exhaust silencer 45. In this space, a ventilation hole 48 is formed so as to communicate the engine chamber 3 with the radiator/exhaust chamber 6. The ventilation hole 48 is disposed in a position displaced from the radiator fan 43 in the long-side direction X of the package 2. A ventilation hood 50 is disposed above the ventilation hole 48.

The ventilation hood 50 covers above and around the ventilation hole 48. An outlet opening 50a of the ventilation hood 50 is formed in a position displaced from the ventilation hole 48 in the short-side direction Y of the package 2 so as to face the ventilation hole 48. In this way, the ventilation hole 48 directly communicates the engine chamber 3 with the radiator chamber 6B (radiator/exhaust chamber 6).

The ventilation hood 50 is a box whose bottom surface is opened, and includes: a front wall 51 and a rear wall 52; side walls 53 and 53 connected to the front wall 51 and the rear wall 52; and a top wall 55. The top wall 55 is inclined downward toward the front.

Lower ends of the rear wall 52 and the side walls 53 and 53 are engaged and secured to a convex part 48a projected from an edge of the ventilation hole 48. The front wall 51 is located forward relative to the ventilation hole 48. A lower end of the front wall 51 is separated apart from the top surface of the upper/lower partition member 32 at a predetermined interval.

A partition plate 56 is projected upward from a front end of the ventilation hole 48. The partition plate 56 partitions the inside of the ventilation hood 50 into a front section and a rear section. A top end of the partition plate 56 is separated apart from an inner surface of the top wall 55 at a predetermined interval. Thus, the ventilation hood 50 and the partition plate 56 constitute a ventilation passage 58 that communicates the ventilation hole 48 with the radiator/exhaust chamber 6. The ventilation passage 58 is formed by a first ventilation passage 58a that communicates with the ventilation hole 48 and a second ventilation passage 58b that opens to the radiator/exhaust chamber 6.

The ventilation hole 48 is disposed in a position displaced from the radiator fan 43 in the long-side direction X of the package 2. Furthermore, the ventilation hood 50 covers above and around the ventilation hole 48. Thus, rainwater that enters from the ventilation outlet 43a hardly enters the ventilation hole 48. For this reason, it is possible to sufficiently enlarge the opening of the ventilation passage 58 for ventilation.

On the upper/lower partition member 32, a rainwater draining part 60 is disposed facing the radiator 42. The rainwater draining part 60 has a downward inclined shape from the center portion to an outer edge portion of the package 2. Specifically, the rainwater draining part 60 is an upward convex part made of a part of the upper/lower partition member 32 by machine processing. The rainwater draining part 60 is constituted by: a top inclined wall 61 inclined so as to gradually lowers toward the other side in the long-side direction X; a front inclined wall 62 and a rear inclined wall 63 extended respectively from a front edge and a rear edge of the top inclined wall 61; and a side wall 64 extended downward from a topmost edge of the top inclined wall 61. The radiator ventilation holes 42a, 42b and 42c are formed in respective positions having substantially the same height as the position of the upper/lower partition member 32.

In the above-described cogeneration system 1, when the operation is started, fuel gas is supplied to the engine 11 while air sucked into the intake chamber 5 is supplied to the engine 11 via the air cleaner 40 and the intake silencer 41, thus the engine 11 is started. When the engine 11 is started, exhaust gas discharged from the engine 11 passes through the exhaust gas heat exchanger 14 and the exhaust silencer 45 for noise reduction, thus is discharged from the upper portion of the package 2 to the outside.

Meanwhile, the cooling water that has cooled the engine 11 passes through the engine coolant circuit 13 so as to be supplied to the radiator 42 and/or the engine waste heat recovery unit 23. The radiator 42 radiates the waste heat of the cooling water supplied to the radiator 42. The engine waste heat recovery unit 23 recovers the waste heat of the cooling water supplied to the engine waste heat recovery unit 23. Then, the engine cooling water is returned to the engine 11 after passing through the engine waste heat recovery unit 23 and/or the radiator 42.

The ventilation fan 21 and the radiator fan 43 are driven to ventilate the inside of the package 2. That is, in the sections of the engine chamber 3 and the device housing chamber 4, the air (ventilation air), which is sucked into the package 2 via the engine chamber ventilation hole 21a, flows into the device housing chamber 4 and the engine chamber 3. The ventilation air from the engine chamber 3 flows upward and enters the ventilation hood 50 via the ventilation hole 48. The ventilation air that entered the ventilation hood 50 further flows upward in the first ventilation passage 58a of the ventilation passage 58, then flows downward in the second ventilation passage 58b guided by the top wall 55. The ventilation air is discharged from the outlet opening 50a and thrown out into the upper/lower partition member 32, thus enters the radiator/exhaust chamber 6. The ventilation air in the radiator/exhaust chamber 6 cools the radiator 42 and then is discharged from the ventilation outlet 43a to the outside air.

In this embodiment, the ventilation hole 48, which communicates the engine chamber 3 with the radiator/exhaust chamber 6, is provided. Thus, the engine chamber 3 is directly communicated with the radiator chamber 6B. Furthermore, the ventilation passage 58 is formed by the ventilation hood 50. Therefore, the ventilation air in the engine chamber 3 flows into the ventilation passage 58 to smoothly enter the radiator chamber, which enable to reduce as much as possible flow resistance of the ventilation air and to reduce pressure loss of the ventilation air.

Also, when the rainwater enters the inside of the package 2 from the ventilation outlet 43a, the rainwater passes through the radiator fan 43 and the radiator 42 so as to be dropped on the top surface of the rainwater draining part 60. The rainwater dropped on the top surface of the rainwater draining part 60 flows over the top inclined wall 61, the front inclined wall 62 and the rear inclined wall 63 of the rainwater draining part 60, i.e., flows from the center portion to the outer edge portion of the package 2. Thus, the rainwater is appropriately drained to the outside from the radiator ventilation holes 42a, 42b and 42c formed respectively in the front surface 2a, the back surface 2b and side surface 2c of the package 2.

In this embodiment, the rainwater draining part 60 is disposed on the upper/lower partition member 32 so as to face the radiator 42. Thus, it is possible to prevent the portion facing the radiator 42 from bending downward, which ensures the drainage of the rainwater on the upper/lower partition member 32.

The rainwater drained from the upper/lower partition member 32 may be drained from a drain outlet (not shown) separately formed in the package 2 other than the radiator ventilation holes 42a, 42b and 42c.

The present invention may be embodied in other forms without departing from the gist or essential characteristics thereof. The foregoing embodiments are therefore to be considered in all respects as illustrative and not limiting. The scope of the invention is indicated by the appended claims rather than by the foregoing description, and all modifications and changes that come within the meaning and range of equivalency of the claims are intended to be embraced therein.

This application claims priority based on Patent Application No. 2014-063048 filed in Japan on Mar. 26, 2014. The entire contents thereof are hereby incorporated in this application by reference.

DESCRIPTION OF REFERENCE NUMERALS

1 Cogeneration system
2 Package
2a Front surface
2b Back surface
2c Right side surface
2d Left side surface
2e Top surface
3 Engine chamber
4 Device housing chamber
5 Intake chamber
6 Radiator/exhaust chamber
6A Exhaust chamber
6B Radiator chamber
7 Partition wall
11 Engine
12 Generator
13 Engine coolant circuit
14 Exhaust gas heat exchanger
15 Controller
21 Ventilation fan
21a Engine chamber ventilation hole
23 Engine waste heat recovery unit
30 Upper structure
31 Frame body
32 Upper/lower partition member
33 Front horizontal member
34 Rear horizontal member
35 Support member
36 Intermediate support
37 Partition wall
40 Air cleaner
41 Intake silencer
42 Radiator
43 Radiator fan
43a Ventilation outlet
45 Exhaust silencer
48 Ventilation hole
50 Ventilation hood
50a Outlet opening
51 Front wall
52 Rear wall
53 Side wall
55 Top wall
56 Partition plate
58 Ventilation passage
60 Rainwater draining part
61 Top inclined wall
62 Front inclined wall
63 Rear inclined wall
64 Side wall
X Long-side direction
Y Short-side direction
Z Vertical direction

The invention claimed is:

1. A package-storage type engine generator comprising: a package partitioned into an upper section and a lower section; an engine and a generator both disposed in the lower section; a radiator and a radiator fan both disposed in the upper section; and an upper/lower partition member configured to partition the package into the upper section and the lower section,
wherein the upper/lower partition member includes a rainwater draining part that is positioned so as to face, the radiator fan, and that is formed in a downward inclined shape from a center portion to an outer edge portion of the package, and
wherein the rainwater draining part is constituted by: a top inclined wall inclined so as to gradually lower toward one side in a long-side direction of the package; a front inclined wall and a rear inclined wall extending respectively from a front edge and a rear edge of the top inclined wall; and a side wall extending downward from a topmost edge of the top inclined wall.

* * * * *